Oct. 7, 1958 E. J. WUORIO 2,854,724
MOLDING APPARATUS
Filed Nov. 24, 1954 2 Sheets-Sheet 1

INVENTOR.
Emil Jalo Wuorio
BY
ATTORNEYS

Oct. 7, 1958  E. J. WUORIO  2,854,724
MOLDING APPARATUS
Filed Nov. 24, 1954  2 Sheets-Sheet 2
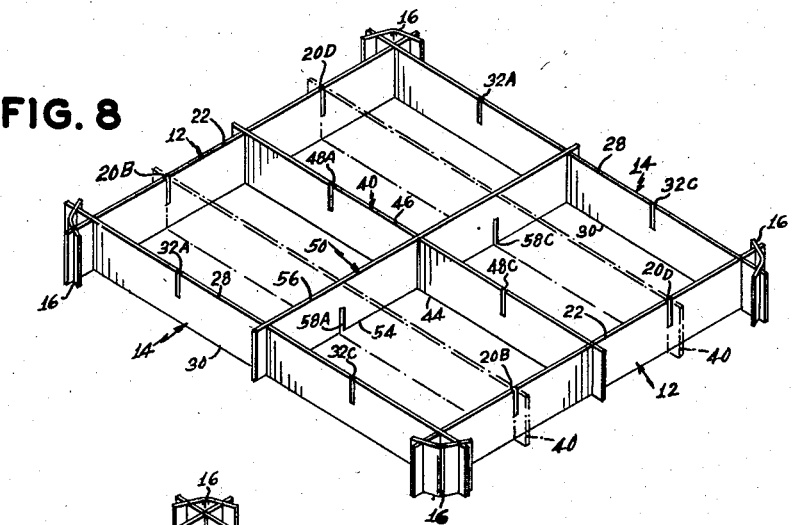
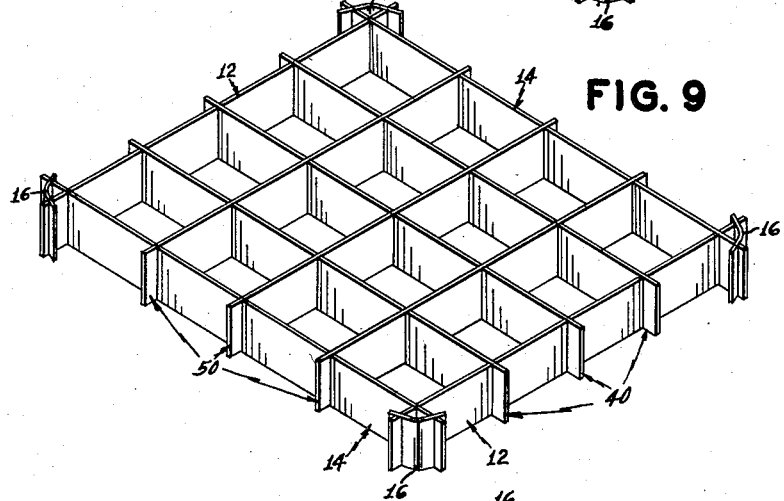
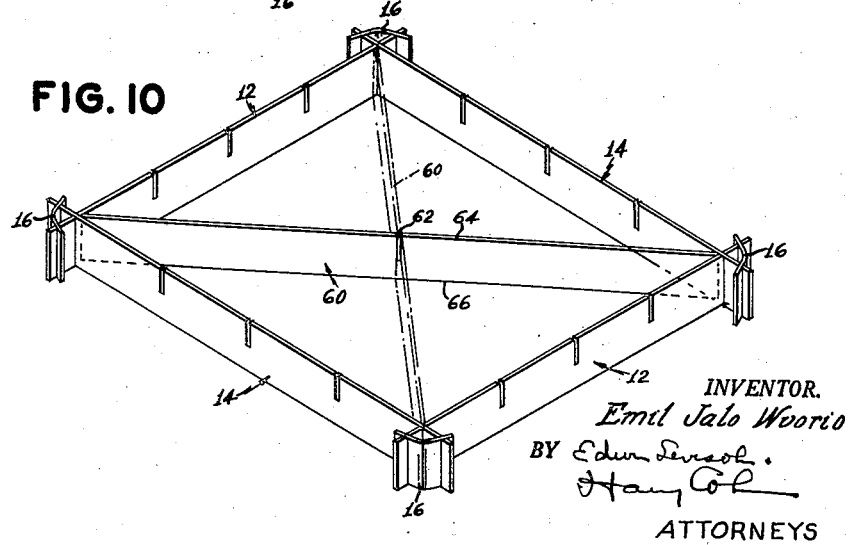
INVENTOR.
Emil Jalo Wuorio
BY
ATTORNEYS

United States Patent Office 2,854,724
Patented Oct. 7, 1958

2,854,724

MOLDING APPARATUS

Emil Jalo Wuorio, Tenafly, N. J., assignor to American Dyewood Company, Belleville, N. J., a corporation of Pennsylvania Application November 24, 1954, Serial No. 471,014

2 Claims. (Cl. 25—121)

The present invention relates to a molding apparatus.

One object of the present invention is the provision of a molding apparatus which can be utilized to form the material to be molded into a plurality of different sized and shaped forms.

Another object is the provision of a molding apparatus which is adapted to mold a basic building element or a plurality of different building elements of various sizes and shapes, wherein each group of building elements of a predetermined size and shape is collectively defined, in said apparatus, by the mold of the basic building element.

Another object is the provision of a molding apparatus of generally simplified construction and design which is especially adapted for use by a home owner, or the like, for the molding of concrete or cement building elements of various different shapes and sizes.

A further object is the provision of a molding apparatus of the previously described type which can be readily assembled and disassembled and, when disassembled, may be formed into a comparatively small package to facilitate the shipment or storage thereof.

The above and other objects, features and advantages of the present invention will be more fully understood from the following description considered in connection with the accompanying illustrative drawings.

In the drawings, which illustrate the best mode presently contemplated of carrying out the invention:

Figs. 8, 9 and 10 are views similar to Fig. 7 and each illustrates a different molding arrangement formed within the basic molding form illustrated in Figure 7.

Figure 1:
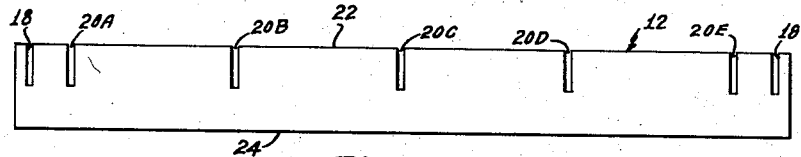
Figs. 1 through 6 are side elevations of various individual molding elements, pursuant to the present invention.
Figure 3:
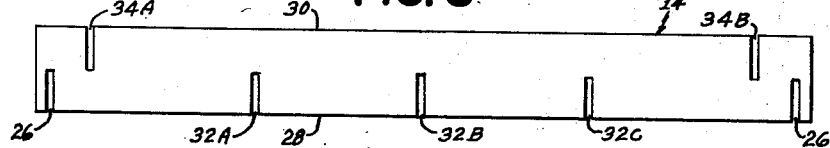
Figures 6, 7:
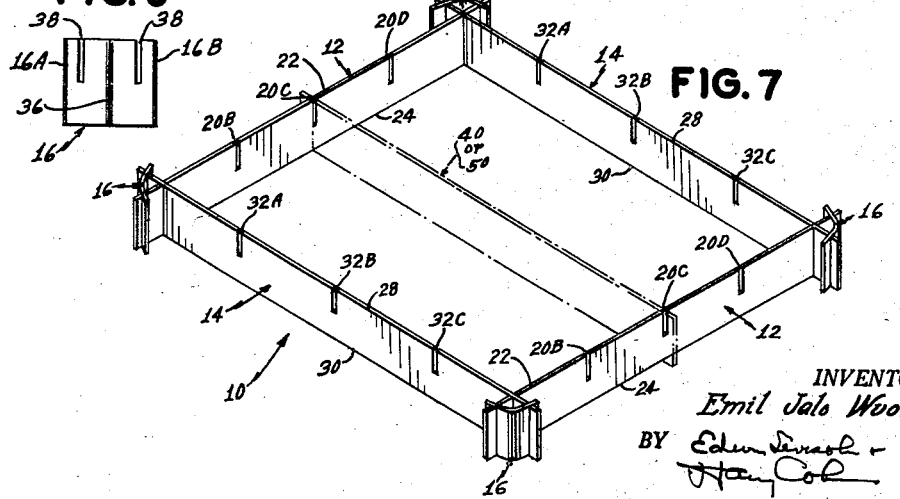
Fig. 7 is a perspective view of the basic mold formed by certain of the molding elements.

Referring to the drawings, and more particularly, to Figure 7 thereof, there is illustrated the basic mold or form 10 which is defined by the molding apparatus of the present invention. The mold 10 is defined by a pair of molding elements 12 (Fig. 1) and a pair of molding elements 14 (Fig. 3) which are assembled to define a square, and are releasably retained in said assembled relation thereof by the locking elements 16 (Fig. 6). Referring to Figures 1 and 3 it will be noted that the molding elements 12 and 14 are substantially of the same overall dimensions.

In the present molding apparatus, provision is made for a pair of molding elements 12. It will be noted that each molding element 12 is provided, adjacent each of the opposite ends thereof, with an open ended slot or notch 18. Five notches, 20A, 20B, 20C, 20D and 20E, substantially similar to the end notches 18, are equally spaced longitudinally of the element 12 between the end notches 18. It will be noted that all of the notches in the molding element 12 are defined therein so as to extend from the same side edge 22 thereof, the opposite side edge 24 being free of said notches.

The molding apparatus of the present invention is provided also with a pair of the molding elements 14. Each molding element 14 is provided, adjacent each of the opposite ends thereof with a notch or open slot 26 which extends inwardly from the side edge 28 thereof toward the opposing side edge 30 thereof. Between said notches 26, the side edge 28 is provided with the three notches or open ended slots, 32A, 32B and 32C, which are equally spaced longitudinally of the element 14 and which extend toward the opposing edge 30. The latter edge is provided with a pair of notches 34A and 34B. The notch 34A is disposed between the notch 32A and the adjacent end notch 26, and the notch 34B is disposed between the notch 32C and the adjacent end notch 26. It will be noted that the notches 20A, 20B, 20C, 20D and 20E of the molding element 12 define four equal integral portions therebetween and similarly the notches 34A, 32A, 32B, 32C and 34B of the molding element 14 define four similarly equal integral portions between the notches 34A and 34B longitudinally of the element 14.

Each locking element 16 is bent along the longitudinal center line 36 thereof, so that the segments 16A and 16B thereof are angularly related, as best illustrated in Figure 7. Each of the integrally related segments 16A and 16B is provided with a notch or open ended slot 38 which extends in a direction parallel to the fold line 36 thereof.

In forming the basic mold or basic mold form 10, as illustrated in Figure 7, both of the elements 12 and both of the elements 14 are utilized. In forming said basic mold, the molding elements 12 are disposed in spaced parallel relation, with each of the notches in one of said elements in registry with the similar notches in the other of said elements, and with the side edges 22 thereof uppermost. Each of the molding elements 14 is interlocked with both the molding elements 12, extending transversely of the latter. More specifically, each molding element 14 is disposed with the side edge 28 thereof uppermost and is moved into engagement with the elements 12 so that the aligned notches 20A, of the opposing molding elements 12, are engaged by the notches 34A and 34B, respectively, of the left hand molding element 14, viewing Figure 7, and the aligned notches 20E, of the spaced molding elements 12, are engaged by the notches 34A and 34B, respectively, of the right hand molding element 14, viewing said figure. Said interlocking engagement of the pair of molding elements 12 and the pair of molding elements 14 defines the basic mold form illustrated in Figure 7, which, as here shown, is in the form of a square. In order to lock said elements into said square defining relationship thereof, the locking elements 16 are each inverted from the position thereof illustrated in Figure 6, and the notches 38 of each locking element engages with the paired locking notches 18 and 26, respectively, of the members 12 and 14, there being a pair of the latter notches disposed outwardly of each corner of the square defined in Figure 7. The square mold is now in condition for use in any well known molding process wherein it will receive a suitable molding material, which, for example and not by way of limitation, may be concrete or mixed cement to form a building element or block in a square form or shape, as defined by the molding apparatus illustrated in Figure 7. Since the actual molding process is well known to those skilled in the art, and since it does not constitute the present invention, a detailed description thereof is considered to be unnecessary herein. It will be noted, therefore, that the basic molding arrangement is defined by eight of the elements of the molding apparatus, namely four molding elements and four locking elements, wherein the notches in the elements 12 are in registry, and the notches in the elements 14 are in registry.

Figure 4:
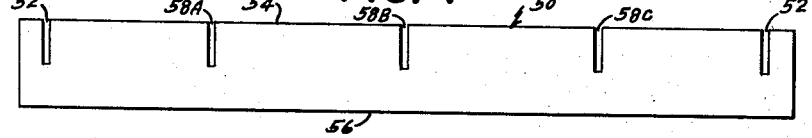
Figure 5:
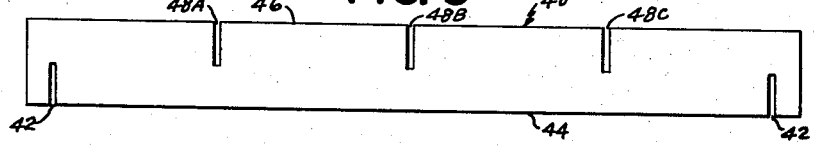

It it is desired to form two rectangular building elements which together have an overall dimension equivalent to the single square building element which can be produced by the molding apparatus as arranged in Figure 7, provision is made for the use of an additional molding element 40 (Fig. 5) or 50 (Fig. 4). It will be noted that the elements 40 and 50 are each substantially similar in dimension to the elements 12 and 14. The element 40 as here shown, is provided with the notches or open ended slots 42, each of which is disposed adjacent one opposite end thereof, and which extend inwardly from the side edge 44 thereof toward the opposing side edge 46. Three equally spaced notches 48A, 48B and 48C are defined in the opposing edge 46 and divide the element 40 into four equal integral portions longitudinally thereof. The square mold arrangement of Figure 7 may be conveniently divided into a pair of rectangular molds through the utilization of one of the molding elements 40. This is accomplished by positioning the molding element 40 with the side edge 46 thereof uppermost and engaging the end notches 42 thereof with the aligned notches 20C, respectively, defined in the opposing molding elements 12, as illustrated in phantom in Figure 7, or by engaging the end notches 42 with the aligned notches 32B, respectively in the molding elements 14.

In lieu of the element 40, the element 50 may be used to form the pair of rectangular molds. It will be noted that the element 50 has a notch 52 adjacent each end thereof and three notches 58A, 58B and 58C equally spaced between the end notches. Element 50 differs from element 40 in that, in the former, all the notches are defined in the same side edge, namely, edge 54, and extend toward the opposite edge 56. Consequently, to form the pair of rectangular molds, the element 50 is inverted from the position thereof illustrated in Fig. 4, and the end notches 52 thereof may be engaged, respectively, either with the aligned notches 20C in the elements 12, or with the aligned notches 32B in the elements 14.

The molding apparatus of the present invention includes three elements 40 and three elements 50. A total of three similar or mixed ones of said elements 40 or 50 can be used to form four rectangular molds within the square mold 10. This can be done by engaging the end notches 42—42 of the elements 40, or the end notches 52—52 of the elements 50, with the aligned notches 20B—20B, 20C—20C or 20D—20D, respectively, so that three elements 40 or 50 will be interlocked between the opposing elements 12. Alternatively, the end notches 42—42 of the elements 40, or the end notches 52—52 of the elements 50, may be engaged with the aligned notches 32A—32A, 32B—32B, 32C—32C, respectively, so that three elements 40 or 50 will be interlocked between the opposing elements 14. This is illustrated in Fig. 8 by the use of three elements inter-engaged between the elements 12 to form four rectangles, said three elements being shown by the element 40 in full line, and the two elements illustrated in phantom. The latter elements can be elements 40 or 50. Furthermore, if desired, only two of the molding elements 40 or 50 need be utilized in the described manner, to provide three rectangular molding areas wherein one mold area will be equal to the sum of the remaining two mold areas, as will be readily understood. The material to be molded may now be inserted into the various rectangular molds, in a manner well known to those skilled in the art, to form a plurality of rectangular building elements which, together, are equal in dimension to the single square building element formed by the basic square mold of Figure 7.

In the arrangement illustrated in Figure 8, four equal square molding areas are defined by the molding apparatus, which four areas together are equal to the basic or overall square molding area defined by the molding apparatus, as arranged in Figure 7. As shown herein, provision is made for a molding element 40 to be interlocked with the opposing molding elements 12 by inter-engaging the end notches 42 of the former with the aligned notches 20C—20C of the latter, as previously described. In addition, a molding element 50 is secured or interlocked with the spaced molding elements 14, and with the molding element 40 therebetween, by engaging the end notches 52 of the molding element 50, with the aligned intermediate notches 32B—32B, respectively, formed in the molding elements 14, and by engaging the intermediate notch 58B in the molding element 50 with the intermediate notch 48B in element 40, so as to form the molding apparatus illustrated in full line in Figure 8. Said apparatus then has defined therein four equal square molding areas, as will be readily apparent. Each of said molding areas may be divided in half so as to define a total of eight rectangular molding areas, as illustrated both in full line and in phantom in Figure 8 by the addition of two more molding elements 40. In the latter case, the end notches 42 in one of the molding elements 40, the left hand molding element illustrated in phantom viewing Figure 8, would interlock with the notches 20B—20B, respectively, defined in the opposing molding elements 12. The other molding element 40, illustrated in phantom in Figure 8, would have the end notches 42 thereof interlocked with the aligned notches 20D—20D, respectively, in the opposed molding elements 12, and the notches 58A and 58B of element 50 would interlock with the notches 48B, respectively of the other two elements.

Referring now to Figure 9 there is shown an arrangement of the molding apparatus herein to form sixteen equal square molding areas, for producing sixteen square building elements of the same size. In this arrangement, all three elements 40 are interengaged between the elements 12. One element 40 has its end notches 42—42 engaged with the aligned notches 20B—20B, respectively; the second element 40 has its end notches 42—42 engaged with the aligned notches 20C—20C, respectively, and the third element 40 has its end notches 42—42 engaged with the aligned notches 20D—20D, respectively. This results in the notches 48A of all three elements 40 being in registry with and between the notches 32A of the elements 14, the notches 48B of all three elements 40 being in registry with and between the notches 32B of the elements 14, and the notches 48C of the all three elements 40 being in registry with and between the notches 32C of the elements 14. The three elements 50 are then inter-engaged between the elements 14 so that one element 50 has its end notches 52—52 engaged with the notches 32A—32A, respectively, and its notches 58A, 58B and 58C engaged with the three aligned notches 48A, respectively. The second element 50 has its end notches 52—52 engaged with the notches 32B—32B, respectively, and its notches 58A, 58B and 58C engaged with the three aligned notches 48B, respectively. The third element 50 has its end notches 52—52 engaged with the notches 32C—32C, respectively, and its notches 58A, 58B and 58C engaged with the three aligned notches 48C, respectively. This arrangement utilizes ten molding elements and the four locking elements 16.

Figure 2:
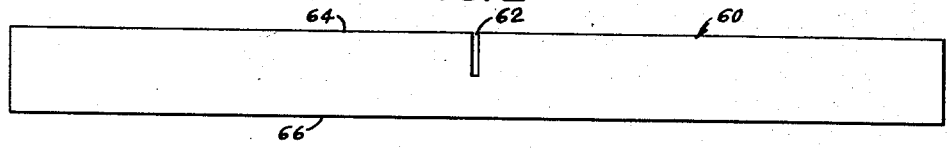

Referring now to Figure 10 there is illustrated an arrangement of the molding apparatus of the present invention for forming triangular molding areas to form triangular building elements. In this connection, provision is made for a molding element 60, as best illustrated in Figure 2. It will be noted that the molding element 60 is substantially longer than all of the other molding elements. As illustrated in Figure 10, the molding element 60 is utilized in connection with the basic molding square defined by the pair of molding elements 12 and by the pair of molding elements 14, which are retained in mold defining relation by the four locking elements 16. The molding element 60 is merely wedged diagonally into position across the basic molding square so that it extends between a pair of opposing corners of the molding square, as illustrated by the molding element 60 shown in full line in Figure 10. Said molding element 60 is retained in position by a frictional fit or a frictional engagement with the elements 12 and 14 as illustrated. Consequently, it will be apparent that through the utilization of a molding element 60, the basic molding square is divided into two triangular molds which together define the basic square mold. Each of the triangular molds may itself be divided into two triangular molds to form a total of four triangular molds. This is accomplished by the addition of an additional molding member 60, as illustrated in phantom in Figure 10. In this connection, it will be noted that the molding elements 60 each contain a central notch or open ended slot 62 which extends from the side edge 64 thereof to the opposing side edge 66. The molding element 60, illustrated in full line in Fig. 10, is disposed with the side edge 64 thereof uppermost and the other molding element 60, illustrated in broken line, is disposed with the side edge 66 thereof uppermost so that when the latter extends between the other two opposing corners, the notches 62 of both said elements will engage to firmly releasably lock the molding elements 60 in the respective positions illustrated in full line and in phantom in Figure 10.

In view of the foregoing, it will be readily apparent that the present invention provides for a molding apparatus which consists of two of each of the molding elements 12, 14 and 60, three each of the molding elements 40 and 50, and four of the locking elements 16, to provide a total of sixteen pieces. With these sixteen pieces, the apparatus may be assembled to form squares, rectangles or triangles of various different sizes. However, in each case, all of the elements which are utilized in any particular molding arrangement define a complete whole, which constitutes the basic molding square illustrated in full line in Figure 7. The twelve molding elements and the four locking elements 16 may be formed of any suitable material, for example and not by way of limitation, metal, plastic, fibreboard, etc. The particular manner of performing the molding operation utilizing the apparatus of the present invention, formed into any desired arrangement thereof, as previously stated, is not described herein, since the molding operation is well known and conventional. However, it will be understood that the various building elements which may be formed of the molding apparatus of the present invention, utilizing cement or concrete, may all be formed of material of one color, or where more than one element is being molded at the same time, building elements of different colors may be formed at the same time by inserting concrete or cement of different colors into the different molding areas.

The molding apparatus may be readily disassembled by merely removing the various elements which have been added to the basic square illustrated in Fig. 7 from the four elements which define said basic square. Thereafter, the locking elements 16 may be readily removed from the basic molding elements which define said square so that said elements may be separated one from another. In the inoperative, or disassembled, condition of the molding apparatus, the various molding elements may be stacked one upon the other so as to minimize the amount of space required for storing or shipping the molding apparatus.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent, is:

1. Molding apparatus comprising a first pair of molding elements each having a notch in the upper edge thereof adjacent each end and notches in said upper edge thereof adjacent said end notches and disposed inwardly from the ends thereof, a second pair of molding elements each having a notch in the upper edge thereof adjacent each end and notches in the lower edge thereof adjacent said end notches and disposed inwardly from the ends thereof, the inwardly disposed notches of said first pair of molding elements interfitting with said inwardly disposed notches of said second pair of molding elements whereby said molding elements define a mold form having a predetermined molding area and the ends of said molding elements having said end notches disposed therein extend outwardly from said mold form and said molding area, and a locking element having a pair of notches in the bottom edge thereof, said notches in said locking element interfitting with adjacent end notches of two intersecting molding elements whereby to lock said two intersecting molding elements in fixed relation to each other outwardly of the molding area.

2. Molding apparatus comprising a first pair of molding elements each having a notch in the upper edge thereof adjacent each end and notches in said upper edge thereof adjacent said end notches and disposed inwardly from the ends thereof, a second pair of molding elements each having a notch in the upper edge thereof adjacent each end and notches in the lower edge thereof adjacent said end notches and disposed inwardly from the ends thereof, the inwardly disposed notches of said first pair of molding elements interfitting with said inwardly disposed notches of said second pair of molding elements whereby said molding elements define a mold form having a predetermined molding area and the ends of said molding elements having said end notches defined therein extend outwardly from said mold form and said molding area, and four locking elements, one for each corner of said molding form, each locking element having a pair of notches in the bottom edge thereof, said notches in said locking elements interfitting with adjacent end notches of two intersecting molding elements whereby to lock said two intersecting molding elements in fixed relation to each other at a corner of said form outwardly of said molding area.

References Cited in the file of this patent

UNITED STATES PATENTS

| | | |
|---|---|---|
| 213,595 | Thorp | Mar. 25, 1879 |
| 811,158 | Maddux | Jan. 30, 1906 |
| 1,008,395 | Ubbink | Nov. 14, 1911 |
| 1,162,887 | Streit | Dec. 7, 1915 |
| 1,456,849 | Greenwood | May 29, 1923 |
| 1,656,420 | Christy et al. | Jan. 17, 1928 |
| 1,961,486 | Hall | June 5, 1934 |
| 2,231,474 | Lachman | Feb. 11, 1941 |
| 2,368,502 | Troiel | Jan. 30, 1945 |
| 2,423,648 | Hansell | July 8, 1947 |
| 2,490,586 | Embree | Dec. 6, 1949 |
| 2,514,805 | Seymour | July 11, 1950 |
| 2,550,977 | Dimock | May 1, 1951 |

FOREIGN PATENTS

| | | |
|---|---|---|
| 53,167 | Netherlands | Sept. 15, 1942 |